(12) United States Patent
Kyrolainen et al.

(10) Patent No.: US 10,033,473 B1
(45) Date of Patent: Jul. 24, 2018

(54) SYSTEMS AND METHODS FOR PERFORMING MULTIPLE INPUT, MULTIPLE OUTPUT (MIMO) OVER-THE-AIR TESTING

(71) Applicant: Keysight Technologies, Inc., Minneapolis, MN (US)

(72) Inventors: Jukka Kyrolainen, Oulu (FI); Pekka Kyosti, Oulu (FI)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/412,408

(22) Filed: Jan. 23, 2017

(51) Int. Cl.
*H04B 17/391* (2015.01)
*H04B 17/00* (2015.01)
*H04W 24/06* (2009.01)
*H04B 7/0456* (2017.01)

(52) U.S. Cl.
CPC ......... *H04B 17/3912* (2015.01); *H04B 7/046* (2013.01); *H04B 17/3911* (2015.01); *H04W 24/06* (2013.01)

(58) Field of Classification Search
CPC ......... H04B 5/00; H04B 17/00; H04B 17/391
See application file for complete search history.

(56) References Cited

U.S. PATENT DOCUMENTS

| | | | |
|---|---|---|---|
| 5,150,336 A * | 9/1992 | Sullivan | G01S 13/42 367/103 |
| 6,657,596 B2 * | 12/2003 | Djuknic | G01R 29/10 343/703 |
| 7,340,248 B2 * | 3/2008 | Kawasaki | H01Q 3/267 342/368 |
| 7,541,994 B2 | 6/2009 | Marshall et al. | |
| 8,995,511 B2 | 3/2015 | Reed | |
| 9,057,801 B2 * | 6/2015 | Jiang | H03M 1/124 |
| 9,288,696 B2 | 3/2016 | Szini et al. | |
| 9,377,495 B2 * | 6/2016 | Chien | G01R 29/105 |
| 9,742,508 B1 * | 8/2017 | Kyosti | H04B 17/12 |
| 2007/0069756 A1 * | 3/2007 | Ambler | G01R 31/002 324/750.27 |
| 2011/0144573 A1 * | 6/2011 | Rofougaran | A61B 5/411 604/66 |
| 2012/0001492 A9 * | 1/2012 | Cook | H01Q 7/00 307/104 |
| 2012/0323690 A1 * | 12/2012 | Michael | G06Q 30/02 705/14.58 |

(Continued)

OTHER PUBLICATIONS

Fan, et al. "Probe Selection in Multiprobe OTA Setups", IEEE Transactions on Antennas and Propagation, vol. 62, No. 4, Apr. 2014.

(Continued)

*Primary Examiner* — Cindy Trandai

(57) ABSTRACT

A multiple-input multiple-output (MIMO) over-the-air (OTA) test system and method are provided that enable a device under test (DUT) to be tested that has no antenna connectors for interfacing antenna elements of the DUT with the MIMO OTA test system. The MIMO OTA test system and method can include a lens system that allows the OTA tests to be performed in a radiating near-field zone, thereby allowing a relatively small and less expensive anechoic chamber to be used in the MIMO OTA test system.

24 Claims, 5 Drawing Sheets

(56) References Cited

U.S. PATENT DOCUMENTS

| | | | | |
|---|---|---|---|---|
| 2013/0027256 A1* | 1/2013 | Guo | H04L 41/0823 | |
| | | | | 343/703 |
| 2013/0295857 A1* | 11/2013 | Nuutinen | H04B 17/009 | |
| | | | | 455/67.12 |
| 2014/0087668 A1* | 3/2014 | Mow | H04W 24/00 | |
| | | | | 455/67.14 |
| 2014/0273873 A1* | 9/2014 | Huynh | H04B 17/008 | |
| | | | | 455/67.12 |
| 2015/0017928 A1* | 1/2015 | Griesing | H04B 17/0085 | |
| | | | | 455/67.14 |
| 2015/0280844 A1* | 10/2015 | Yu | H04B 17/0085 | |
| | | | | 375/224 |
| 2015/0310722 A1* | 10/2015 | Sousa | H02J 7/025 | |
| | | | | 307/104 |
| 2015/0372398 A1* | 12/2015 | Dudorov | H01Q 25/008 | |
| | | | | 342/368 |
| 2016/0124071 A1* | 5/2016 | Baxley | G01S 5/0263 | |
| | | | | 348/143 |
| 2016/0212641 A1* | 7/2016 | Kong | H04B 17/0087 | |
| 2016/0310765 A1* | 10/2016 | Beckman | A61N 5/1084 | |
| 2016/0321479 A1* | 11/2016 | Uhl | G06K 7/10356 | |
| 2017/0033837 A1* | 2/2017 | McCormack | H04B 5/0031 | |
| 2017/0134201 A1* | 5/2017 | Kim | H04L 27/264 | |
| 2017/0141454 A1* | 5/2017 | Welle | H04B 17/103 | |

OTHER PUBLICATIONS

Fan, et al. "Over-the-air Performance Evaluation of Massive MIMO Base Stations in Sectorized Multi-Probe Anechoic Chambers", IEEE Antennas and Propagation Magazine, 2016.

* cited by examiner

SYSTEMS AND METHODS FOR PERFORMING MULTIPLE INPUT, MULTIPLE OUTPUT (MIMO) OVER-THE-AIR TESTING

BACKGROUND

In multiple input multiple output (MIMO) communications systems, multiple antennas are used on both the base station and on the mobile device to exploit a phenomenon known as multipath propagation in order to achieve higher data rates. In general, MIMO communications systems simultaneously send and receive multiple data signals over each radio channel. The multipath propagation phenomenon is the result of environmental factors that influence the data signals as they travel between the base station and the mobile device, including, for example, ionospheric reflection and refraction, atmospheric ducting, reflection from terrestrial objects and reflection from bodies of water. Because of these factors, the data signals experience multipath interference that results in constructive interference, destructive interference, or fading, and phase shifting of the data signals. MIMO technology has been standardized in various wireless communications standards including Institute of Electrical and Electronics Engineers (IEEE) 802.11n, IEEE 802.11ac, HSPA+ (3G), WiMAX (4G) and Long Term Evolution (LTE) standards.

MIMO communications systems require testing. A typical MIMO test system for performing "conducted" testing of a base station includes a user equipment (UE) device or UE device emulator, the base station device under test (DUT), a test system computer, and various electrical cables for interconnecting the components. The antenna ports of the UE device or device emulator are typically connected to input ports of the fading emulator by electrical RF cables, although they in some cases they are electromagnetically coupled to the input ports of the fading emulator via a radiated air interface. Output ports of the fading emulator are connected to the DUT. The testing is referred to as "conducted" testing due to the wired connection between the output ports of the fading emulator and the DUT. The test system computer is typically connected to UE device or UE device emulator and to the fading emulator by respective electrical data cables, e.g., Ethernet cables. The test system computer is is in communication with the base station DUT. During OTA testing, the test system computer receives information from the base station DUT that the test system computer processes to evaluate the transmit and/or receive capabilities of the base station DUT.

The next generation of wireless infrastructure (e.g., base stations, backbone, etc.) and customer handsets is called $5^{th}$ generation mobile networks or $5^{th}$ generation wireless systems, referred to hereinafter as "5G". 5G is very ambitious standard that involves millimeter-wave frequency usage, compact phased arrays, and an unprecedented amount of electronic integration. Not only will the transmitters and receivers be integrated into transceivers, but transceivers will be integrated with patch antennas or antenna arrays. This will be the case for both the UE devices and for the base stations. The integrated transceiver and antenna or antenna array is referred to hereinafter as an "integrated transceiver-antenna assembly."

In the 5G integrated transceiver-antenna assembly of the base stations and UE devices, there will be no traditional connector from the radio electronics to the antenna elements. Because the antenna elements will be very small and there will be a very large number of them integrated together with other electrical components on the same circuit board, external connectors for interfacing the test system with the antenna elements will not be available. For example, the transceiver-antenna assembly may be integrated in the same printed circuit board (PCB) package or ball grid array (BGA) package. In other words, the entire radio, including its antenna or antenna array and its transceiver, will be a single indivisible unit. For these reasons, 5G base stations and UE devices will not be able to be tested by typical MIMO test systems that perform conducted testing.

Nevertheless, radio manufacturers will want their units tested for all of the usual characteristics, e.g., receiver sensitivity, both without and with interference present, total transmit power, error vector magnitude (EVM) of modulation formats, antenna radiation pattern, etc. All of these parameters must be measured and studied in great detail during the product design phase. The non-separable nature of an integrated transceiver-antenna assembly renders traditional transceiver testing methods useless.

The best MIMO test system that is currently available for testing base station DUTs is a multi-probe anechoic chamber (MPAC) over-the-air (OTA) test system. In a typical MPAC OTA system, the base station DUT is located inside of a large anechoic chamber that also has a multi-probe antenna element configuration. The antenna elements of the base station DUT are not required to be physically connected to the output ports of the fading emulator. Rather, the probe antenna elements of the multi-probe antenna element configuration are connected to the output ports of the fading emulator to allow OTA testing rather than conducted testing of the base station DUT to be performed. However, the MPAC OTA test system has drawbacks in terms of cost and space requirements. One drawback is that the MPAC OTA testing method is a radiating far-field testing method that requires that probe antennas be positioned in the radiating far-field zone of the base station DUT, which, in the case of massive MIMO test systems and high frequencies (e.g., 28 GHz), may be several meters. Consequently, the anechoic chamber must be relatively large, typically requiring at least ten square meters of floor space, which leads to the chamber being very expensive.

The MPAC OTA test system also requires many probe antennas and many fading emulator channels to feed the probe antennas. The number of required probe antennas increases as a function of the number of clusters that are in the channel model, and in a multi-user case, also as a function of the number of users. Furthermore, a dynamic channel model that employs dynamic cluster angle evolution over time requires a very high number of probe antenna elements even in a single-user case that uses a relatively simple channel model. Consequently, it is anticipated that a MPAC OTA test system for testing 5G base stations will be extremely expensive due to the requirements for a very large anechoic chamber and an emulator having a very large number of channels.

A need exists for a robust OTA MIMO test system and method that can be used to test base stations and UE devices that do not have connectors for connecting the test system to the antenna ports of the base station or UE device and that can be achieved at relatively low cost. A need also exists for such a MIMO test system and method that eliminate the need for a large anechoic chamber, that eliminate the need for the fading emulator to have a very large number of channels, and that eliminate the need for the probe antenna element array configuration to have a very large number of probe antenna elements.

SUMMARY

The present embodiments are directed to MIMO OTA test systems, methods and computer code. The MIMO OTA test system, in accordance with an embodiment, comprises a transmitter device, a fading emulator, an anechoic chamber, an array of probe elements, and a test system computer. The transmitter device has a plurality of antenna ports from which a plurality of time-varying radio frequency (RF) signals are transmitted. The fading emulator has a plurality of input ports and a plurality of output ports. The time-varying RF signals are received in the input ports of the fading emulator. The fading emulator is configured to operate on the received time-varying RF signals in accordance with a preselected reference channel model and a set of fading channel coefficients to produce a plurality of time-varying RF output signals. The time-varying RF output signals are outputted from the fading emulator via the output ports of the fading emulator. The array of probe antenna elements is disposed in the anechoic chamber and is electrically coupled to the output ports of the fading emulator to receive the time-varying RF output signals outputted from the output ports of the fading emulator. The array of probe antenna elements emits an electromagnetic (EM) beam having a predetermined beamform and beamshape that are based on the preselected reference channel model and the fading channel coefficients. The DUT is disposed in the anechoic chamber and has a plurality of antenna elements electromagnetically coupled via a non-wired, air interface with the array of probe antenna elements. The antenna elements of the DUT detect the EM beam and produce RF output signals.

The test system computer is in communication with at least the DUT and the fading emulator via respective communication links. The test system computer configures the fading emulator with the preselected reference channel model and the set of fading channel coefficients to cause the EM beam emitted by the array of probe antenna elements to have the predetermined beamform and beamshape. The test system computer receives measurement information from the DUT relating to the RF output signals produced by the antenna elements of the DUT.

The method comprises:

with a transmitter device of the MIMO OTA test system having a plurality of antenna ports, transmitting a plurality of time-varying radio frequency (RF) signals from the antenna ports of the transmitter device;

with a fading emulator of the MIMO OTA test system, receiving the respective time-varying RF signals in respective input ports of the fading emulator, the fading emulator being configured to operate on the received time-varying RF signals in accordance with a preselected reference channel model and a set of fading channel coefficients to produce a plurality of time-varying RF output signals;

outputting the time-varying RF output signals from the fading emulator from output ports of the fading emulator;

with an array of probe antenna elements electrically coupled to the output ports of the fading emulator of the MIMO OTA test system, receiving the time-varying RF output signals and performing beamforming and beamshaping operations in accordance with the received time-varying RF output signals to emit an electromagnetic (EM) beam having a predetermined beamform and beamshape that are based on the preselected channel reference model and on the set of fading channel coefficients;

with a test system computer that is in communication with the fading emulator and with the DUT via respective communication links, prior to transmitting the plurality of time-varying RF signals from the antenna ports of the transmitter device, configuring the fading emulator with the preselected reference channel model and the set of fading channel coefficients to cause the EM beam emitted by the array of probe antenna elements to have the predetermined beamform and beamshape;

with the plurality of antenna elements of the DUT, detecting the EM beam and producing RF output signals; and with the test system computer, receiving measurement information from the DUT relating to the RF output signals produced by the antenna elements of the DUT.

The computer code comprises a first code portion and a second code portion. The first code portion executes an algorithm that obtains the set fading channel coefficients. The second code portion configures the fading emulator to model the preselected reference channel model with the obtained set of fading channel coefficients.

These and other features and advantages will become apparent from the following description, claims and drawings.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
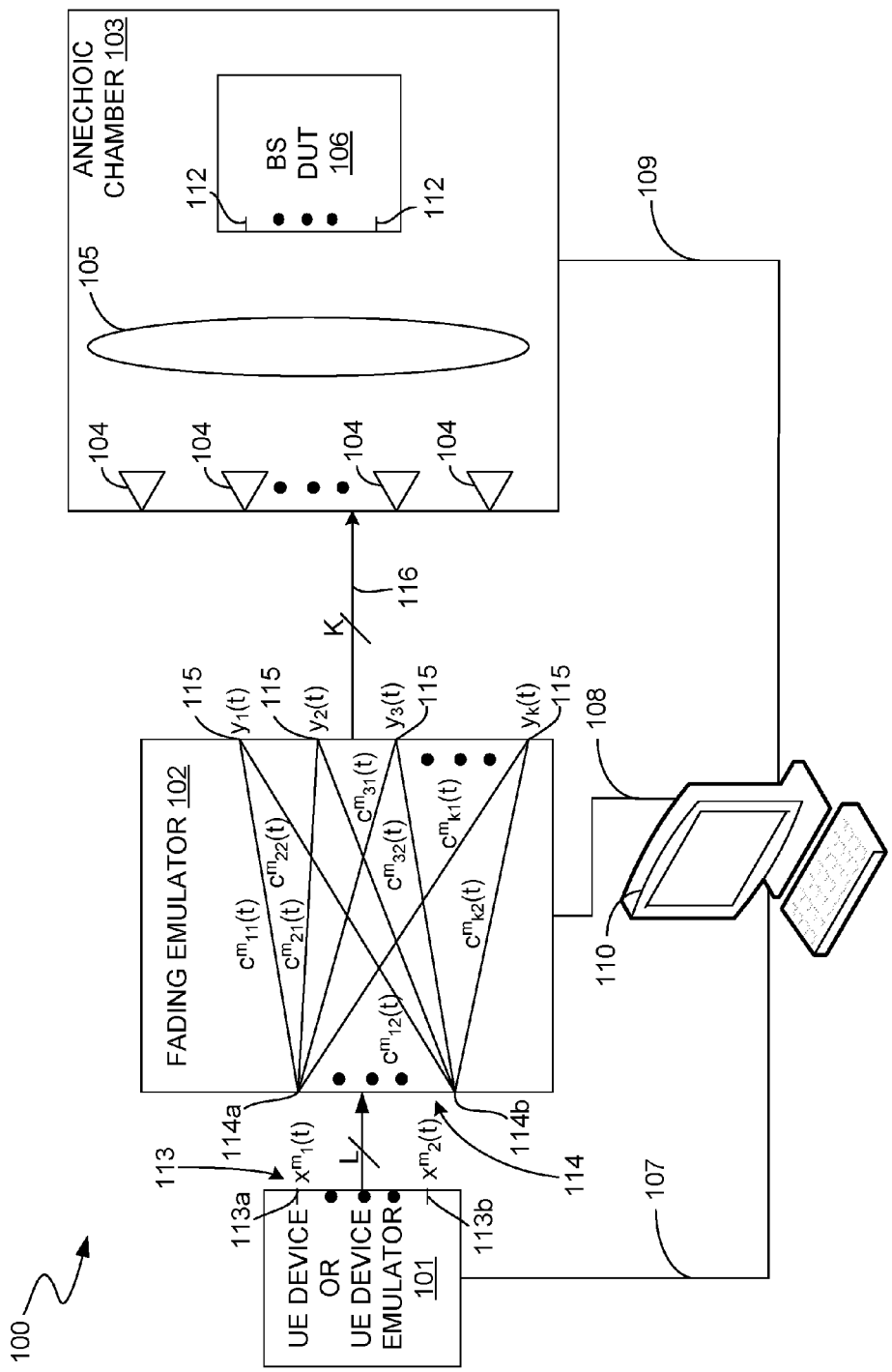
FIG. 1 is a schematic block diagram illustrating a MIMO test system in accordance with a representative embodiment.

Representative embodiments disclosed herein are directed to a MIMO OTA test system and method that enable a DUT to be tested that has no antenna connectors for interfacing antenna elements of the DUT with the MIMO OTA test system. The MIMO OTA test system can include a lens system that allows the OTA tests to be performed in a radiating near-field zone, thereby allowing a relatively small and relatively inexpensive anechoic chamber to be used in the MIMO OTA test system.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as a computer having one or more processors or processing cores. The processor may for instance be a multi-core processor. A processor may also refer to a collection of processors within a single computer system or distributed amongst multiple computer systems. The term "computer" should also be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

FIG. 1 illustrates a block diagram of the MIMO OTA test system 100 in accordance with an exemplary, or representative, embodiment for performing OTA testing of a DUT 106. In accordance with this representative embodiment, the DUT 106 is a base station (BS), but the inventive principles and concepts are also applicable to OTA testing of a UE device. In accordance with this representative embodiment, the MIMO OTA test system 100 comprises a UE device or UE device emulator 101, a fading emulator 102, an anechoic chamber 103, an array of probe antenna elements 104 disposed in the anechoic chamber 103, a lens system 105 disposed in the anechoic chamber 103, and a test system computer 110, which may be, for example, a PC. The BS DUT 106 is disposed inside of the anechoic chamber 103 and has a plurality of antenna elements 112. For ease of discussion, the UE device or UE device emulator 101 will be referred to hereinafter as "the UE device 101," but it should be understood that the UE device 101 may denote an actual UE device such as a handheld wireless device (e.g., a smart phone) or an emulator that emulates an actual UE device.

The test system computer 110 is electrically coupled via communication links 107, 108 and 109 to the UE device 101, the fading emulator 102 and the BS DUT 106, respectively. The wired communication links 107, 108 and 109 may be wired or wireless communication links. Importantly, it is not necessary to make any wired, or conductor, connections between antenna connectors (not shown) of the BS DUT 106 and the MIMO OTA test system 100. In fact, for exemplary purposes, it will be assumed herein that the BS DUT 106 does not have such antenna connectors. As indicated above, for BSs that are designed to meet the 5G standard, it is anticipated that the BSs will not have antenna connectors to which wired, or conductor, connections can be made to interconnect the test system with the antenna ports of the BSs. As indicated above, in known test systems that require such a wired connection between antenna connectors of the DUT and the MIMO test system, the tests are commonly referred to as "conducted" tests rather than OTA tests. The MIMO OTA test system 100 is capable of performing OTA testing of a DUT that has no such antenna connectors, such as a DUT that is designed to meet the 5G standard and that has no antenna connectors.

In order to perform non-conducted, or OTA, testing, the test system computer 110 configures the fading emulator 102 to model a preselected reference channel model taking into account the OTA testing environment in which testing will be performed. Channel coefficients, h, of the preselected reference channel model are complex time-variant coefficients that are dictated by the reference channel model being modeled by the fading emulator (e.g., dictated by a specification of a particular standard). When channel emulation is performed in known test systems that perform conducted tests, the fading emulator convolves the signals received at its input ports with the corresponding channel coefficients, h, to produce output signals that are outputted from output ports of the fading emulator to drive the probe antenna elements. Because the MIMO OTA test system 100 performs non-conducted, OTA testing, it utilizes weighting coefficients, w, to compose desired, or intended, angular and polarimetric characteristics for the electromagnetic fields to which the BS DUT 106 is to be exposed during testing. The weighting coefficients w are determined before the actual emulation operations are performed by the fading emulator 102. As will be described below with reference to Equations 1-9, the channel coefficients h of the preselected reference channel model and the weighting coefficients w that dictate the intended angular and polarimetric characteristics for the electromagnetic fields to which the BS DUT 106 will be exposed during testing are coupled with one another to produce fading channel coefficients, C.

In accordance with an embodiment, the test system computer 110 performs an algorithm that couples the channel coefficients h with the weighting coefficients w to produce fading channel coefficients C and uploads the fading channel coefficients C into the fading emulator 102, which utilizes them to modulate the signals propagating along the channels of the fading emulator 102. The fading emulator 102 convolves the fading channel coefficients C, instead of the channel coefficients h, with the signals propagating along the channels of the fading emulator 102 to produce output signals that drive the array of probe antenna elements 104. In accordance with another embodiment, the weighting coefficients w are determined and uploaded by the test system computer into the fading emulator 102, which couples the weighting coefficients w with the channel coefficients h in real time to produce the fading channel coefficients C that are used by the fading emulator 102 to modulate the signals propagating along the channels of the fading emulator 102. The manner in which fading channel coefficients C are obtained is described below in more detail with reference to FIGS. 4 and 5.

In accordance with this representative embodiment, the UE device 101 has L antenna elements 113 over which L respective time-varying RF signals are transmitted and received, where L is a positive integer that is greater than or equal to 2. The MIMO OTA test system 100 is bidirectional and may be used to test the transmitting and receiving capabilities of the BS DUT 106 and to test the transmitting and receiving capabilities of the UE device 101. For ease of discussion, only the testing of the receiving capabilities of the BS DUT 106 will be described in detail with reference to FIG. 1. For this example, it will be assumed that the UE device 101 has first and second antenna elements 113a and 113b, respectively (i.e., L=2), over which first and second time-varying RF signals, $x^m{}_1(t)$ and $x^m{}_2(t)$, respectively, are transmitted.

The fading emulator 102 has L input ports 114 for inputting the time-varying RF signals that are transmitted by the UE device 101. For this example, it will be assumed that the fading emulator 102 has first and second input ports 114a and 114b, respectively, for inputting the first and second time-varying RF signals, $x^m{}_1(t)$ and $x^m{}_2(t)$, respectively. The first and second time-varying RF signals $x^m{}_1(t)$ and $x^m{}_2(t)$, respectively, may be coupled to the first and second input ports 114a and 114b, respectively, of the fading emulator 102 via respective electrical RF cables (not shown) or, alternatively, the interface between the UE device 101 and the fading emulator 102 may be a radiating air interface such that the first and second time-varying RF signals $xm_1(t)$ and $mx_2(t)$, respectively, are coupled to first and second antenna elements (not shown) of the first and second input ports 114a and 114b, respectively, of the fading emulator 102 over the radiating air interface.

The fading emulator 102 is configured by the test system computer 110 to model a preselected reference channel model that includes a plurality of clusters. The reference channel model that is modeled by the fading emulator 102 is typically a geometry-based spatial channel model known in the art as a spatio-temporal-polarimetric channel model. The reference channel model is dynamic in that it can be varied in accordance with control signals sent by the test system computer 110 to the fading emulator 102 over communication link 108. As will be described below in more detail, the test system computer 110 configures the fading emulator 102 to model a preselected reference channel model and provides resulting fading channel coefficients C to the fading emulator 102, or provides weighting coefficients w to the fading emulator 102 that it uses to derive the fading channel coefficients C. The fading emulator 102 applies the fading channel coefficients C to the clusters. The test system computer 110 is capable of subsequently varying the configuration of the preselected reference channel model that is modeled by the fading emulator 102 by sending different sets of fading channel coefficients C or weighting coefficients w to the fading emulator 102.

The fading emulator 102 has K output channels 115, where K is a positive integer that is greater than or equal to 2. Each output 115 of the fading emulator 102 is connected via a respective electrical RF cable, represented by line 116, to one of the probe antenna elements 104 of the array of probe antenna elements 104. The fading emulator 102 has a number of channels over which the first and second time-varying RF signals $x^m{}_1(t)$ and $x^m{}_2(t)$ pass. As the first and second time-varying RF signals $x^m{}_1(t)$ and $x^m{}_2(t)$ pass along these channels, they are operated on in a predetermined manner by the fading channel coefficients C, which are shown as $c^m{}_{11}(t)$-$c^m{}_{k2}(t)$ in FIG. 1, to produce time-varying RF output signals $y_1(t)$-$y_k(t)$. The time-varying RF output signals $y_1(t)$-$y_k(t)$ are then applied to the probe antenna elements 104. In this way, the selection and/or varying of the fading channel coefficients $c^m{}_{11}(t)$-$c^m{}_{k2}(t)$ by the test system computer 110 controls beamforming and beamshaping operations performed by the array of probe antenna elements 104. Thus, the test system computer 110 dynamically varies the manner in which the array of probe antenna elements 104 performs beamforming and beamshaping operations.

The lens system 105 is designed and configured to refract and/or reflect electromagnetic waves emitted by the probe antenna elements 104 in a predetermined manner. Each cluster of the preselected reference channel model being modeled by the fading emulator 102 has a respective set of the aforementioned weighting coefficients w applied thereto. Each set of weighting coefficients is based on several parameters, including (1) the intended cluster arrival angles at the lens system 105, (2) the intended cluster arrival angles at the BS DUT 106, and (3) the intended cluster departure angles at the probe antenna elements 104. As indicated above, the corresponding weighting coefficients w are coupled with the corresponding channel coefficients h to produce fading channel coefficients, C, which are either uploaded by the test system computer 110 into the fading emulator 102 or determined in real time in the fading emulator 102 based on weighting coefficients W uploaded by the test system computer 110 into the fading emulator 102. The fading emulator 102 utilizes the fading channel coefficients C to modulate the signals propagating along the channels of the fading emulator 102 to produce the output signals, $y_1(t)$-$y_k(t)$, of the fading emulator 102 that drive the probe antenna elements 104.

Employing the lens system 105 in the anechoic chamber 103 allows the probe antenna elements 104 to be positioned in the radiating near-field zone of the BS DUT 106. As indicated above, for the test method performed by a typical MPAC OTA system, the probe antennas are required to be in the radiating far-field zone of the DUT, which results in the anechoic chamber consuming tens of square meters of floor space. In contrast, the anechoic chamber 103 only needs to be large enough in size to meet the radiating near-field zone requirements and to house the array of probe antenna elements 104, the lens system 105, the BS DUT 106 and any supporting components. The term "radiating near-field zone," as that term is used herein, denotes a zone that extends a distance away from the DUT antenna 112 of up to $2D^2/\lambda$ (i.e., the Fraunhofer distance), where D is the diameter of the DUT antenna 112 and $\lambda$ is the operating wavelength of the DUT antenna 112. The lens system 105 may be a single electromagnetic refractive lens, a single electromagnetic reflector, multiple electromagnetic refractive lenses, multiple electromagnetic reflectors or a combination of one or more electromagnetic refractive lenses and electromagnetic reflectors.

In the case where all or a portion of the beamforming and/or beamshaping tasks performed by the array of probe antenna elements 104 are performed in the analog domain, the array of probe antenna elements 104 may include one or more analog RF components, such as one or more phase shifters, for example. In such cases, the weighting of one or more of the probe antenna elements 104 in accordance with the fading channel coefficients C is implemented by at least one analog RF component. For ease of illustration, such analog RF components are not shown in FIG. 1. In the case where the beamforming and/or beamshaping tasks are performed entirely in the digital domain, each output port 115 of the fading emulator 102 is connected to a respective one of the probe antenna elements 104, and thus the number of output ports 115 is equal to the number of probe antenna elements 104 such that each respective fading channel coefficient is applied to the respective probe antenna element 104. In the case where the beamforming and/or beamshaping tasks are performed partially in the digital domain and partially in the analog domain, each output port 115 of the fading emulator 102 may be connected to respective subsets of the probe antenna elements 104, where each subset has at least one probe antenna element 104. In the latter case, the probe antenna elements 104 of each subset are interconnected by analog RF components to enable phase and amplitude adjustments to be made to the probe antenna elements 104 of the subsets in order to achieve the intended weighting. For ease of discussion, it will be assumed hereinafter that all beamforming and beamshaping tasks are performed in the digital domain, but persons of skill in the art will understand, in view of the description provided herein, that the inventive principles and concepts apply also to beamforming and beamshaping tasks performed in the analog domain or performed partially in the digital domain and partially in the analog domain.

In addition to the advantages of providing the ability to use a smaller anechoic chamber 103 in the MIMO OTA test system 100 and not needing that BS DUT 106 to have antenna connectors for interfacing the antenna elements of the BS DUT 106 with the MIMO OTA test system 100, the MIMO OTA test system 100 provides other advantages. One additional advantage is that the number of required probe antenna elements 104 and the number of output ports 115 of the fading emulator 102 do not depend on number of clusters that are in the reference channel model or on the number of UE devices 101 that are used in the test scenario. Rather, the number of probe antenna elements 104 and the number of output ports 115 of the fading emulator 102 depend on the minimum required cluster angle spread, as the cluster angle spread is controlled by the beamwidth provided by the array of probe antenna elements 104. This allows greater flexibility in selecting the reference channel model and allows the cost of the MIMO OTA test system 100 to be kept relatively low. In addition, the cluster angle spread can be controlled dynamically, accurately and smoothly by the test system computer 110 independently of the number of probe antenna elements 104 employed in the MIMO OTA test system 100. Another advantage is that the beamwidth depends on the number of probe antenna elements 104 used in the MIMO OTA test system 100, which means that the beamwidth, as well as the isolation between the beams, can be controlled through the selection of the number of probe antenna elements 104 employed in the MIMO OTA test system 100.

In addition, the minimum achievable cluster angle spread can also be narrower than the beamwidth provided by the array of probe antenna elements 104 because the lens system 105 is capable of focusing the beams onto the BS DUT 106, if necessary.

Figure 2:
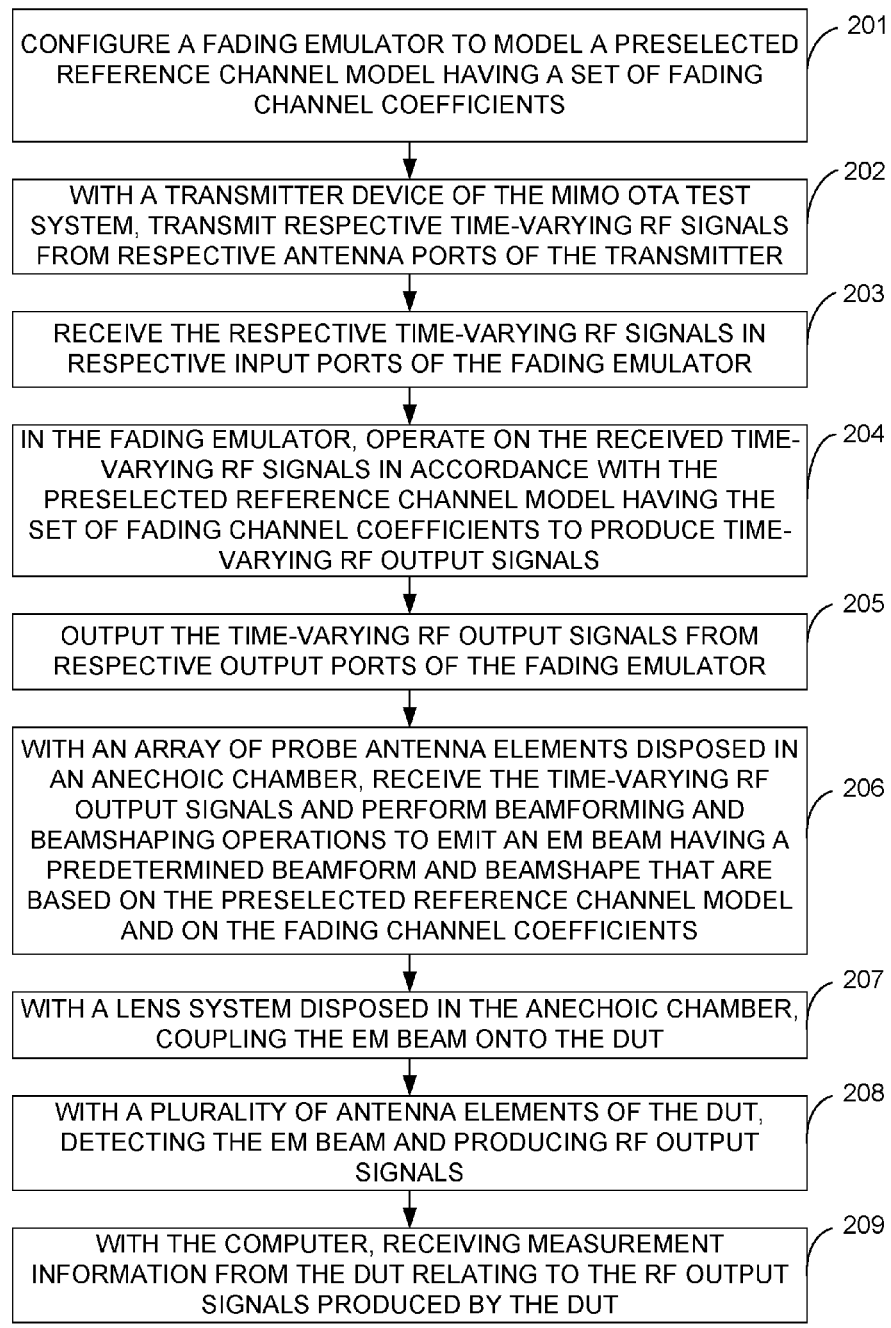
FIG. 2 illustrates a flow diagram that represents the MIMO OTA test method performed by the MIMO OTA test system shown in FIG. 1 in accordance with a representative embodiment.

FIG. 2 illustrates a flow diagram that represents the test method performed by the MIMO OTA test system 100 shown in FIG. 1 in accordance with a representative embodiment. Because the MIMO OTA test system 100 is bidirectional and may be used to test the transmitting and receiving capabilities of the BS DUT 106 and to test the transmitting and receiving capabilities of the UE device 101, the method represented by the flow diagram of FIG. 2 makes no distinction between the device that is transmitting the test signals, which may be a UE device, a UE device emulator, a BS or a BS emulator, and the DUT that is being tested, which may be a UE device or a BS. The flow diagram refers to the device that is transmitting the test signals as "a transmitter" and refers to the DUT that is being tested as "the DUT."

Prior to performing the test method, a test system setup procedure is performed. For the MIMO OTA test system 100 shown in FIG. 1, the test system setup procedure includes the steps of disposing the array of probe antenna elements 104, the lens system 105 and the BS DUT 106 in the anechoic chamber 103, connecting first and second ends of a first set of electrical RF cables to the output ports 115 of the fading emulator 102 and to the probe antenna elements 104, respectively, selecting a reference channel model, and configuring the fading emulator 102 to model the preselected reference channel model.

After the test system setup procedure has been performed, the fading emulator 102 is configured to model a preselected reference channel model with a set of fading channel coefficients, as indicated by block 201. The preselected reference channel model defines a plurality of clusters and three-dimensional (3-D) and 3-D cluster arrival directions and angular spreads for each cluster. In accordance with an embodiment, the test system computer 110, which is in communication with the fading emulator 102 via the communication link 108, either calculates the set of fading channel coefficients C or obtains it during a calibration process and uploads it to the fading emulator 102, as will be described below in more detail with reference to FIGS. 4 and 5, respectively. Alternatively, the test system computer 110 calculates a set of weighting coefficients w or obtains it via a calibration process and uploads it to the fading emulator 102, which then uses it to generate the fading channel coefficients C. In any case, the emulation process is performed using the fading channel coefficients C. Respective time-varying RF signals are then transmitted from respective antenna ports of a transmitter device of the OTA test system, as indicated by block 202. The transmitter device that is used for this purpose may be a transmitter of a UE device or the transmitter of a BS, depending on whether the BS or the UE device is being tested.

In the fading emulator 102, the time-varying RF signals are received in respective input ports 114 of the fading emulator 102, as indicated by block 203. As indicated above, the fading emulator 102 is configured to model a preselected reference channel model having a plurality of clusters and a set of fading channel coefficients that are provided by the test system computer 110 to the fading emulator 102. In the fading emulator 102, the received time-varying signals are operated on in accordance with the preselected reference channel model and the set of fading channel coefficients to produce respective time-varying RF output signals, as indicated by block 204. The respective time-varying RF output signals are outputted from the fading emulator 102 over K respective output ports 115 of the fading emulator 102, as indicated by block 205. As indicated above, the K output ports of the fading emulator 102 are connected to first ends of a first set of electrical RF cables and second ends of the first set of electrical RF cables are connected to the array of probe antenna elements 104 disposed in an anechoic chamber 103.

The array of probe antenna elements 104 receives the K time-varying RF output signals and performs beamforming and beamshaping operations in accordance with the received time-varying RF output signals to emit an electromagnetic (EM) beam having a predetermined beamform and beamshape, as indicated by block 206. The shape and form of the EM beam emitted by the array of probe antenna elements is based on the preselected channel reference model and on the set of fading channel coefficients C used by the fading emulator 102 to perform the emulation operations. Thus, as indicated above, the test system computer 110 controls the formation and shaping of the EM beam that is being emitted by the array of probe antenna elements 104 by configuring the fading emulator 102 to model the preselected reference channel model with the set of fading channel coefficients C.

The lens system 105 disposed in the anechoic chamber 103 couples the EM beam having the predetermined form and shape onto the DUT 106, as indicated by block 207. A plurality of antenna elements of the DUT 106 detect the EM beam and produce RF output signals, as indicated by block 208. The test system computer 110 receives measurement information from the DUT 106 relating to the RF output signals produced by the DUT 106, as indicated by block 209. Various types of measurement information relating to the RF output signals produced by the DUT 106 may be sent by the DUT 106 to the test system computer 110, including, for example, phase and power measurements. The inventive principles and concepts are not limited with respect to the types of measurement information that the DUT 106 sends to the test system computer 110.

Figure 3:
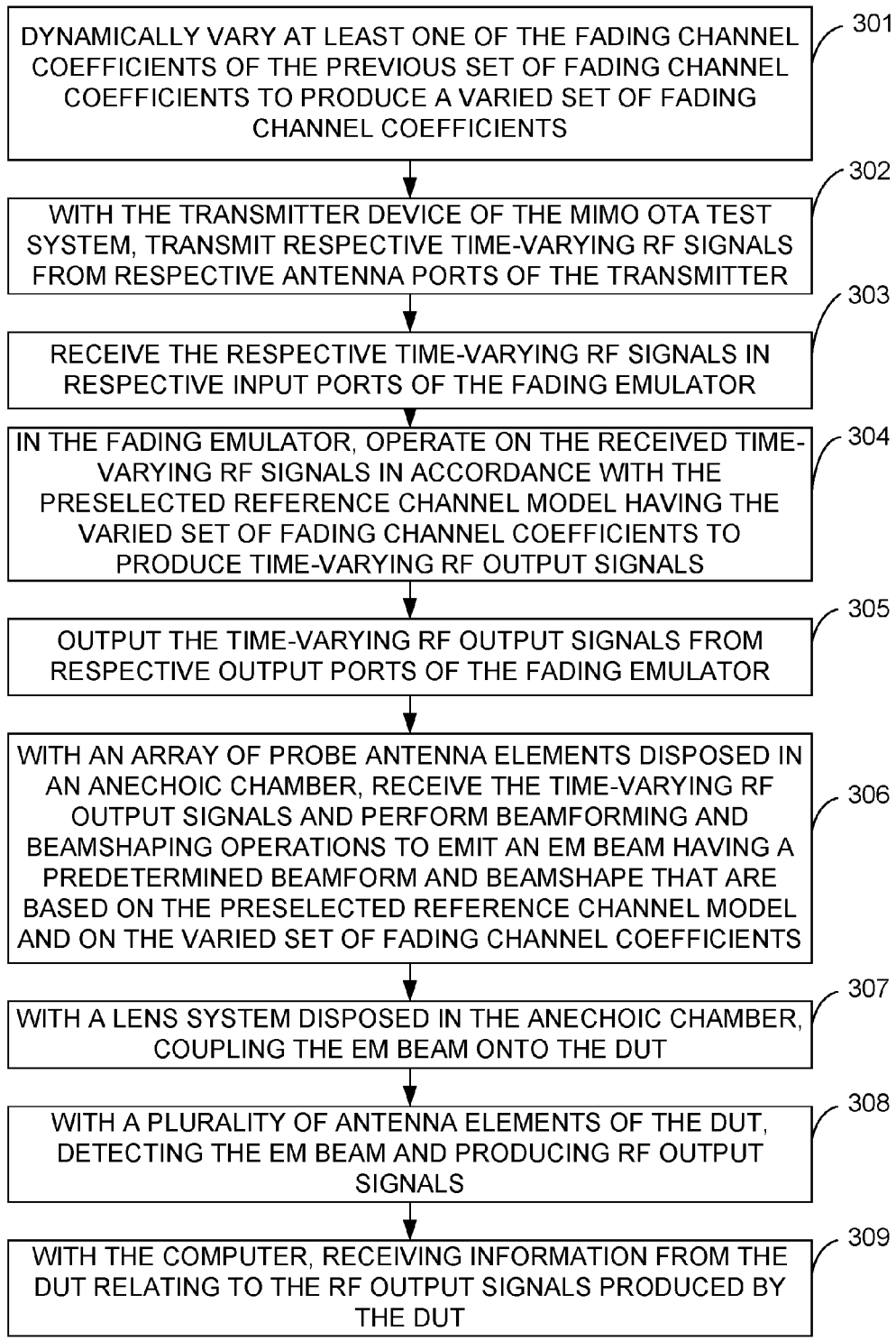
FIG. 3 illustrates a flow diagram that represents the OTA test method performed by the MIMO OTA test system shown in FIG. 1 in accordance with a representative embodiment.

As indicated above, the test system computer 110 is also configured to dynamically vary the set of fading channel coefficients C that is used by the fading emulator 102 in order to vary the form and shape of the EM beam that is emitted by the array of probe antenna elements 104. The flow diagram illustrated in FIG. 3 represents the method in accordance with a representative embodiment for dynamically varying the set of fading channel coefficients C that is used by the fading emulator 102 to thereby vary the form and shape of the EM beam that is emitted by the array of probe antenna elements 104.

Block 301 of the flow diagram represents the step of configuring the fading emulator 102 by varying at least one of the fading channel coefficients C of the previous set of fading channel coefficients C used in the emulation operations represented by block 204 of FIG. 2. This step can be accomplished by varying the fading channel coefficients C or by varying the weighting coefficients w that are used in combination with the channel coefficients h to generate the fading channel coefficients C. In the step represented by block 302, respective time-varying RF signals are transmitted from respective antenna ports of the transmitter device of the OTA test system. In the fading emulator 102, the time-varying RF signals are received in respective input ports 114 of the fading emulator 102, as indicated by block 303. In the fading emulator 102, the received time-varying signals are operated on in accordance with the preselected reference channel model and the varied set of fading channel coefficients to produce respective time-varying RF output signals, as indicated by block 304. The respective time-varying RF output signals are outputted from the fading emulator 102 over K respective output ports 115 of the fading emulator 102, as indicated by block 305.

The array of probe antenna elements 104 receives the K time-varying RF output signals and performs beamforming and beamshaping operations in accordance with the received time-varying RF output signals to emit an EM beam having a predetermined beamform and beamshape, as indicated by block 306. The predetermined beamform and beamshape of the EM beam emitted by the array of probe antenna elements 104 is based on the preselected channel reference model and on the varied set of fading channel coefficients used by the fading emulator 102 to perform the emulation operations. Thus, as indicated above, the test system computer 110 dynamically varies the beamform and beamshape of the EM beam that is being emitted by the array of probe antenna elements 104 by varying the set of fading channel coefficients that is used by the fading emulator 102 to perform emulation operations.

The lens system 105 disposed in the anechoic chamber 103 couples the EM beam having the predetermined beamform and beamshape onto the DUT 106, as indicated by block 307. A plurality of antenna elements of the DUT 106 detect the EM beam and produce RF output signals, as indicated by block 308. The test system computer 110 receives measurement information from the DUT 106 relating to the RF output signals produced by the DUT 106, as indicated by block 309.

Although the flow diagrams of FIGS. 2 and 3 depict separate processes, the processes may be merged into a single process. The steps represented by blocks 202-209 of FIG. 2 are virtually identical to the steps represented by blocks 302-309 of FIG. 3, respectively. Therefore, the processes may be merged by, for example, connecting the output of block 209 to the input of block 301, eliminating blocks 302-309, and connecting the output of block 301 to the input of block 202. In this example, the emulation process represented by block 204 would be performed using the set of fading channel coefficients C provided at block 201 or the varied set of fading channel coefficients C provided at step 301 in accordance with control signals sent by the test system computer 110 to the fading emulator 102 via communication link 108.

The fading channel coefficients C that are sent by the test system computer 110 to the fading emulator 102 may be calculated by the test system computer 110 or they may be determined by the test system computer 110 via a calibration process. Alternatively, the test system computer 110 may calculate the weighting coefficients w and upload them into the fading emulator 102, in which case the fading emulator 102 couples the weighting coefficients w with the channel coefficients h in real time to generate the fading channel coefficients C during the emulation process. The process of calculating the fading channel coefficients C in the test system computer 110 or in the fading emulator 102 will first be described with reference to a representative embodiment.

For M UE devices that each have S antenna ports notated as s=1, . . . , S, the UE radiation patterns are known and are embedded in the reference channel model, where M is a positive integer that is greater than or equal to 1. The reference channel model comprises N clusters, or propagation paths, notated as n=1, . . . , N, where N is a positive integer that is greater than or equal to 2. The array of probe antenna elements 104 has K probe antenna elements notated as k=1, . . . , K. The probe antenna elements 104 are in preselected locations in the anechoic chamber 103 and have preselected radiation patterns.

The reference channel model between antenna port s of UE device m and the DUT can be expressed as:

$$H_s^m(t) = \sum_{n=1}^{N} h_{sn}^m(t, \tau_{mn}, \Omega_{mn}^{DUT}), \quad \text{(Equation 1)}$$

where $\Omega^{DUT}=(\varphi^{DUT}, \theta^{DUT})$ represents the cluster azimuth and elevation angles of arrival (departure for testing DUT transmitter capabilities) for the DUT and τ is the cluster delay. In OTA testing, the UE antenna responses are embedded in the channel coefficients h while the DUT antenna responses are excluded from the channel coefficients h. As indicated above, the test system is bidirectional and is reciprocal. For ease of discussion and in the interest of brevity, only the uplink direction (i.e., UE device transmitting, DUT receiving) is described in the following.

During the test, each cluster n of antenna element s of UE device m is transmitted by beam [n,m] of the array of probe antenna elements 104 such that the correct cluster arrival angle is realized for the receiving DUT. The composite signal transmitted by beam [n,m] of the array of probe antenna elements 104 may be expressed as:

$$z_{sn}^m(t, \Omega) = \sum_{k=1}^{K} x_s^m(t) * w_{kn}^m(t) f_k(\Omega) h_{sn}^m(t, \tau_{mn}, \Omega_{mn}^{DUT}), \quad \text{(Equation 2)}$$

where $f_k \in C$ is the response of probe antenna element k of the array of probe antenna elements 104. The EM propagation field, i.e., a wavefront consisting of EM propagation waves corresponding to $z_{sn}^m$ transmitted by beam [n,m], propagates through the lens system 105, which refracts and/or reflects the EM propagation waves towards the focusing point of the lens system 105. The focusing point is located at the centre of the test area of the anechoic chamber 103 in accordance with this representative embodiment, which is where the BS DUT 106 is located. The relationship between the angle of departure from the probe element of the array of probe antenna elements 104 ($\Omega^{probe}$) and the angle of departure from the lens system 105 ($\Omega^{LAS}$) can be expressed as:

$$(\varphi^{LAS}, \theta^{LAS}) = (q\varphi^{probe}, -p\theta^{probe}), \quad \text{(Equation 3)}$$

where q and p depend on the focusing point location of the lens system 105, the distance between the lens system 105 and the array of probe antenna elements 104, and $\Omega^{DUT}$.

In order to generate the reference channel model expressed by Eq. 1 for the BS DUT 106, the cluster departure angle from the lens system 105 is set to correspond to the cluster arrival angle for the DUT 106. This requirement can be expressed as:

$$(\varphi_{mn}^{LAS}, \theta_{mn}^{LAS}) = (180 - \varphi_{mn}^{DUT}, -\theta_{mn}^{DUT}), \quad \text{(Equation 4)}$$

and the required cluster departure angle from the array of probe antenna elements 104 may be expressed as:

$$(\phi_{mn}^{probe}, \theta_{mn}^{probe}) = \left(\frac{\phi_{mn}^{DUT} - 180}{q}, \frac{\theta_{mn}^{DUT}}{p}\right) \quad \text{(Equation 5)}$$

The radiation pattern for the beam [n,m] may be expressed as:

$$F_n^m(\Omega) = \sum_{k=1}^{K} w_{kn}^m(t) f_k(\Omega) \quad \text{(Equation 6)}$$

and the weighting coefficients $w_{kn}^m(t)$ of cluster n at time instant t is a vector that may be expressed as:

$$w_n^m = \{w_{kn}^m\}_{k=1,\ldots,K} \quad \text{(Equation 7)}$$

The weighting coefficient vector of Eq. 7 is calculated to maximize the radiation pattern of the array of probe antenna elements 104 in the direction $\Omega_{mn}^{probe}=(\varphi_{mn}^{probe}, \theta_{mn}^{probe})$. The test system computer 110 can use any simple beamforming algorithm to calculate the weighting coefficients such that the beam is maximized towards the desired angle of departure. For example, a beamforming algorithm that performs the operations expressed mathematically by the following equation would be suitable for this purpose:

$$w_n^m = \arg(\max(F_n^m(\Omega_{mn}^{probe}))) \quad \text{(Equation 8)}$$

In addition, any generic beamshaping algorithm can be performed by the test system computer 110 in calculating the weighting coefficients to adjust the width of the EM beam according to cluster angle spread and to minimize array sidelobes in the direction toward the lens system 105.

The fading channel coefficients C that are uploaded by the test system computer 110 to the fading emulator 102 and used in blocks 204 and 304 of FIGS. 2 and 3, respectively, are calculated by an algorithm executed by the test system computer 110 that couples the weighting coefficient vector w with the channel coefficient vector h in accordance with the expression:

$$C_{ks}^m(t) = \sum_{n=1}^{N} w_{kn}^m(t) h_{sn}^m(t, \tau_{mn}, \Omega_{mn}^{DUT}), \quad \text{(Equation 9)}$$

As indicated above, the weighting coefficients w may be calculated in accordance with Equations 7 and 8 by the test system computer 110 and then uploaded into the fading emulator 102, in which case the calculations represented by Equation 9 are performed in the fading emulator 102 in real time. The signal transmitted by each probe antenna element k of the array of probe antenna elements 104 may be expressed as:

$$y_k(t, \Omega) = \sum_{m=1}^{M} \sum_{s=1}^{S} x_s^m(t) * C_{ks}^m(t) f_k(\Omega) \quad \text{(Equation 10)}$$

Figure 4:
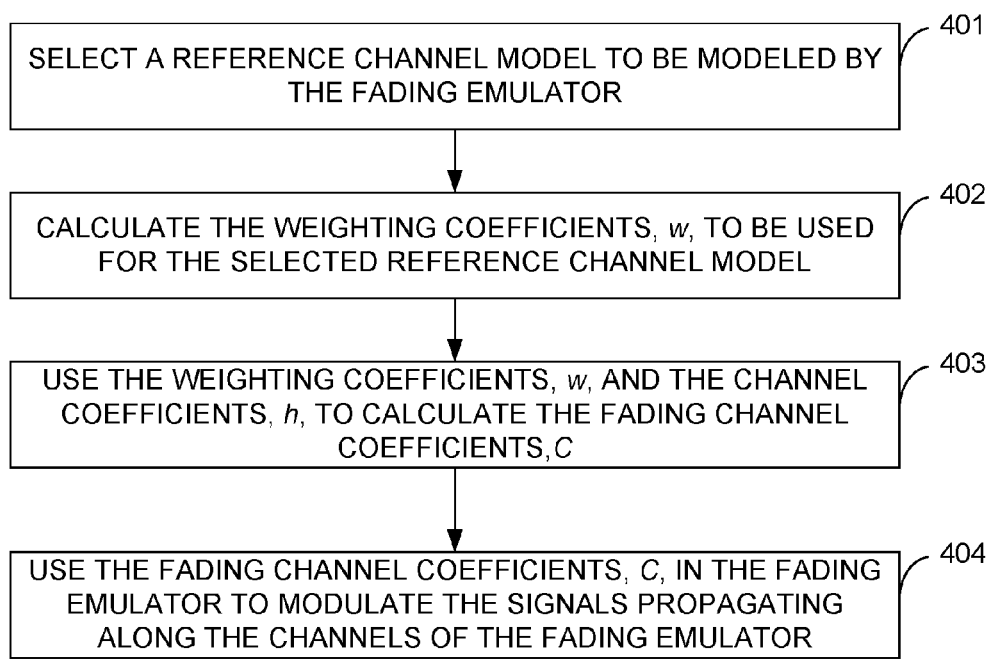
FIG. 4 illustrates a flow diagram of the MIMO OTA test method in accordance with a representative embodiment for calculating fading channel coefficients to be used in the MIMO OTA test system shown in FIG. 1 and in the methods represented by the flow diagrams shown in FIGS. 2 and 3.

FIG. 4 illustrates a flow diagram that represents the method performed to calculate the fading channel coefficients C in accordance with Equations 1-9. The fading channel coefficients C are typically calculated prior to performing OTA testing, but in some cases they may be calculated in real time during OTA testing. A reference channel model to be modeled by the fading emulator 102 is selected, as indicated by block 401. As indicated above, the selected reference channel model defines a plurality of clusters and 3-D cluster arrival directions and cluster angular spreads for each cluster. The weighting coefficients w are calculated for the selected reference channel model, as indicated by block 402. The manner in which the weighting coefficients w are calculated is as described above with reference to Equation 7. The channel coefficients h are known at the time that the reference channel model is selected. The weighting coefficients w and the channel coefficients h are then used to calculate the fading channel coefficients C, as indicated by block 403. As described above, the process represented by block 403 may be performed in the test system computer 110 or partially in the test system computer 110 and partially in the fading emulator 102. The manner in which the weighting coefficients w and the channel coefficients h are used to calculate the fading channel coefficients C is as described above with reference to Equation 9. The fading channel coefficients C are then used by the fading emulator 102 to modulate the signals propagating along the channels of the fading emulator 102, as indicated by block 404.

The cluster power angular spectrum is typically Laplacian in nature. The shape of the EM beam pattern formed by the array of probe antenna elements 104 is typically a good approximation of a Laplacian shape. Therefore, the adjustment of beamwidth can also be achieved by changing the number of probe antenna elements 104 that are used for beamforming, i.e., setting the fading channel coefficients to zero for unused probe antenna elements 104. Beam [n,m] is non-zero outside of cluster [n,m] angular coverage. Radiation outside the desired cluster angular coverage is seen as an incorrect interference for the other users/clusters and it can be considered as error. This error can be minimized by minimizing the sidelobes of the array of probe antenna elements 104 within the view angle of the lens system 105. The spacing between the antenna elements of the DUT and the beamforming algorithm can be optimized to minimize the sidelobes of the antenna elements of the DUT within the view angle of the lens system 105. The achievable sidelobe level can be reduced by adding more probe antenna elements 104 to the MIMO OTA test system 100.

The manner in which the fading channel coefficients C used in steps 204 and 304 of FIGS. 2 and 3, respectively, can be determined through use of a calibration process rather than through calculations will now be described. A test area is assumed to be a rectangular surface approximating a planar antenna element array of the DUT 106. The test area is sampled with L locations defined by vectors $\bar{r}_l$, where l=1, . . . , L. The test system setup procedure mentioned above includes calibration of the lens system 105, the array of probe antenna elements 104, the EM characteristics of the anechoic chamber 103, and other components. These components are calibrated by measuring transfer functions from each probe antenna element 104 to each corresponding test zone location $\bar{r}_l$. The measurements of the transfer functions can be obtained by using, for example, a network analyser (not shown) and a known calibration antenna (not shown). The calibration process is performed separately for two orthogonal transmitter polarizations and two orthogonal receiver polarizations. The result is a 2-by-2 polarimetric transfer function for each $\bar{r}_l$ pair:

$$c_{l,k}(f) = \begin{bmatrix} c_{l,k}^{\theta\theta}(f) & c_{l,k}^{\varphi\theta}(f) \\ c_{l,k}^{\theta\varphi}(f) & c_{l,k}^{\varphi\varphi}(f) \end{bmatrix} \in C^{2\times 2} \quad \text{(Equation 11)}$$

For simplicity, the polarization dimension is omitted in the following discussion. It is expected that the off diagonal terms of calibration values will be small and can be neglected. Furthermore, the following procedure for finding the weighting coefficients w can be performed separately with $c_{l,k}^{\theta\theta}$ and $c_{l,k}^{\varphi\varphi}$ for the two polarizations. The result is a matrix of complex transfer functions as a function of frequency:

$$H_c(f) = \{c_{l,k}(f)\} \in C^{l \times K}. \quad \text{(Equation 12)}$$

With a vector of weighting coefficients (complex weights) w={$w_k$}∈$C^{K \times 1}$, the EM field at S test zone locations can be expressed as:

$$b(f) = H_c(f)w \in C^{L \times 1}. \quad \text{(Equation 13)}$$

It should be noted that in principle the vector of weighting coefficients w can also be made dependent on frequency.

Assuming that the preselected reference channel model is a typical geometry-based model, and thus specifies, among other aspects, the cluster power, the nominal azimuth and elevation angles of arrival (departure) $\Omega_n = (\varphi_n, \theta_n)$, as well as the azimuth and elevation angular spreads $\Phi_n, \Theta_n$, for the cluster n as observed by the DUT 106. Typically, the preselected reference channel model also specifies a shape function for the power angular distribution. Based on all of this information, a power angular spectrum (PAS) for the cluster n is specified as $P_n(\varphi,\theta)$. Assuming coherent phases, the target PAS can be projected to the lth sample of the test zone as:

$$a_l(f) = \int\int \exp\left(\frac{j2\pi f \bar{\Omega}(\varphi,\theta) \cdot \bar{r}_l}{v_c}\right) P_n(\varphi,\theta) d\varphi d\theta \in C, \quad \text{(Equation 14)}$$

where $\bar{\Omega}(\varphi,\theta)$ is a unit vector from direction $(\varphi,\theta)$, "·" denotes the vector dot product, and $v_c$ is the speed of light. The PAS is time-variant in the case of dynamic modeling of cluster angles, and thus the samples of the test zone $a_l$ can also be time-variant. Define the target field for cluster n as $a_n(f) = \{a_l(f)\} \in C^{L \times 1}$, the vector of weighting coefficients w for cluster n can be determined by minimizing the following cost function using a numerical optimization method:

$$w_n = \underset{w}{\operatorname{argmin}} \sum_l |a_n(f) - b_n(f)|^2, \quad \text{(Equation 15)}$$

where $w_n$ is time-variant in the case of time-variant $a_l$ due to dynamic modelling of cluster angles.

Having determined the vector of weighting coefficients w, the fading channel coefficients C can be determined by the test system computer 110 in the aforementioned manner in accordance with Equation 9. The fading channel coefficients C are uploaded by the test system computer 110 to the fading emulator 102 and used by the fading emulator 102 to perform the emulation operations represented by blocks 204 and 304 of FIGS. 2 and 3, respectively.

Figure 5:
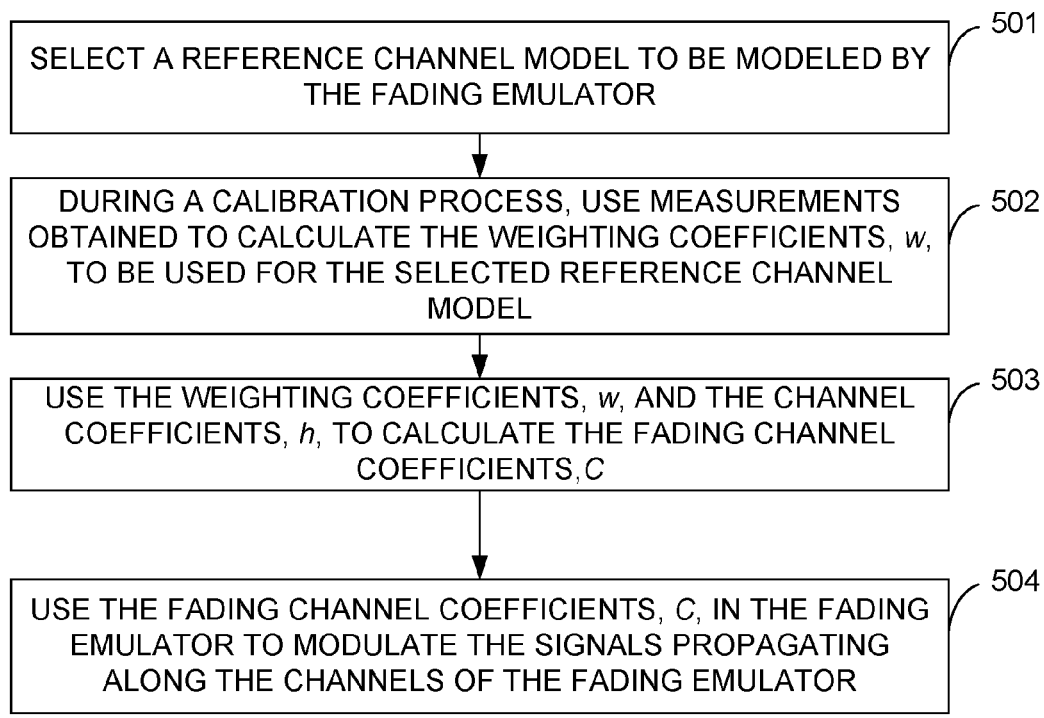
FIG. 5 illustrates a flow diagram of the MIMO OTA test method in accordance with a representative embodiment for using a calibration process to obtain fading channel coefficients to be used in the MIMO OTA test system shown in FIG. 1 and in the methods represented by the flow diagrams shown in FIGS. 2 and 3.

FIG. 5 illustrates a flow diagram that represents the method performed by the test system computer 110 to determine the fading channel coefficients C via a calibration process in accordance with Equations 11-15 and 9. A reference channel model to be modeled by the fading emulator 102 is selected, as indicated by block 501. During a calibration process, measurements obtained are used to calculate the weighting coefficients w for the selected reference channel model, as indicated by block 502. The manner in which the measurements are obtained and used to calculate the weighting coefficients w is as described above with reference to Equations 11-15. The channel coefficients h are known at the time that the reference channel model is selected. The weighting coefficients w and the channel coefficients h are then used to calculate the fading channel coefficients C, as indicated by block 503. The manner in which the weighting coefficients w and the channel coefficients h are used to calculate the fading channel coefficients C is as described above with reference to Equation 9. The fading channel coefficients C are then used in the fading emulator to modulate the signals propagating along the channels of the fading emulator, as indicated by block 504.

The test system computer 110 has one or more processors (not shown) configured to execute computer instructions, or code, in the form of software and/or firmware to perform the algorithms described above with reference to FIGS. 2-5. These instructions are stored in one or more memory devices that are internal to or external to the test system computer 110. Such memory devices constitute non-transient computer-readable mediums. A variety of non-transient computer-readable mediums are suitable for use with the invention, including, for example, solid state storage devices, magnetic storage devices and optical storage devices.

While the invention has been illustrated and described in detail in the drawings and foregoing description, such illustration and description are to be considered illustrative or exemplary and not restrictive. The invention is not limited to the disclosed embodiments. For example, while the MIMO OTA test system 100 shown in FIG. 1 includes the lens system 105, other embodiments of the MIMO OTA test system may not include the lens system 105, in which cases the anechoic chamber would need to be large enough to enable testing to be performed in the radiating far-field zone. As another example, while a UE device 101 is depicted in FIG. 1 as transmitting a test signal and a BS is depicted as the DUT 106 that receives the transmitted signal, in other embodiments the BS is transmitting the test signal and the UE device is the DUT receiving the transmitted signal. In other words, if the receiving capabilities of the DUT are being tested, the device transmitting the test signal may be any suitable transmitter or transceiver device and the DUT receiving the test signal may be any suitable receiver or transceiver device. If the transmitting capabilities of the DUT are being tested, the DUT transmitting the test signal may be any suitable transmitter or transceiver device and the receiver that receives the transmitted signal may be any suitable receiver or transceiver device. Other variations to the disclosed embodiments can be understood and effected by those skilled in the art in practicing the claimed invention, from a study of the drawings, the disclosure, and the appended claims.

What is claimed is:

1. A multiple-input multiple-output (MIMO) over-the-air (OTA) test system for testing a device under test (DUT), the test system comprising:
   a transmitter device having a plurality of antenna ports from which a plurality of time-varying radio frequency (RF) signals are transmitted;
   a fading emulator having a plurality of input ports and a plurality of output ports, the time-varying RF signals being received in the input ports, the fading emulator being configured to operate on the received time-varying RF signals in accordance with a preselected reference channel model and a set of fading channel coefficients to produce a plurality of time-varying RF output signals, the time-varying RF output signals being outputted from the fading emulator via the output ports of the fading emulator;
   an anechoic chamber, an array of probe antenna elements being disposed in the anechoic chamber and electrically coupled to the output ports of the fading emulator to receive the time-varying RF output signals outputted from the output ports of the fading emulator, the array of probe antenna elements emitting an electromagnetic (EM) beam having a predetermined beamform and beamshape that are based on the preselected reference channel model and the fading channel coefficients, wherein the DUT is disposed in the anechoic chamber and has a plurality of antenna elements electromagnetically coupled via a non-wired, air interface with the array of probe antenna elements, the antenna elements of the DUT detecting the EM beam and producing RF output signals; and
   a test system computer that is in communication with at least the DUT and the fading emulator via respective communication links, wherein the test system computer configures the fading emulator with the preselected reference channel model and the set of fading channel coefficients to cause the EM beam emitted by the array of probe antenna elements to have the predetermined beamform and beamshape, and wherein the test system computer receives measurement information from the DUT relating to the RF output signals produced by the antenna elements of the DUT.

2. The test system of claim 1, further comprising:
   a lens system between the array of probe antenna elements and the DUT, the lens system coupling the EM beam onto the antenna elements of the DUT.

3. The test system of claim 2, wherein the DUT is located within a radiating near-field zone of the array of probe antenna elements.

4. The test system of claim 1, wherein the DUT is located within a radiating far-field zone of the array of probe antenna elements.

5. The test system of claim 1, wherein the DUT comprises a base station and the transmitter device comprises a user equipment (UE) device or UE device emulator.

6. The test system of claim 1, wherein the transmitter device comprises a base station and the DUT comprises a user equipment (UE) device or UE device emulator.

7. The test system of claim 1, wherein the DUT includes no external antenna connectors for electrically interfacing the test system with the antenna elements of the DUT.

8. The test system of claim 1, wherein the test system computer executes an algorithm that calculates weighting coefficients for the preselected reference channel model and couples the weighting coefficients with channel coefficients of the preselected reference channel model to obtain the set of fading channel coefficients.

9. The test system of claim 1, wherein the test system computer executes an algorithm that determines weighting coefficients for the preselected reference channel model via a calibration process and couples the weighting coefficients with channel coefficients of the preselected reference channel model to obtain the set of fading channel coefficients.

10. The test system of claim 1, wherein the test system computer executes an algorithm that obtains weighting coefficients for the preselected reference channel model and causes the weighting coefficients to be uploaded to the fading emulator, and wherein the fading emulator couples the weighting coefficients with channel coefficients of the preselected reference channel model to obtain the set of fading channel coefficients.

11. A method for testing a device under test (DUT) in an anechoic chamber of a multiple-input multiple-output (MIMO) over-the-air (OTA) test system, the method comprising:

transmitting a plurality of time-varying radio frequency (RF) signals from a plurality of antenna ports of a transmitter device of the MIMO OTA system;

receiving the time-varying RF signals in respective input ports of a fading emulator of the MIMO OTA system, operating on the received time-varying RF signals in accordance with a preselected reference channel model and a set of fading channel coefficients to produce a plurality of time-varying RF output signals, and outputting the time-varying RF output signals from the fading emulator from output ports of the fading emulator;

receiving the time-varying RF output signals with an array of probe antenna elements of the anechoic chamber electrically coupled to the output ports of the fading emulator of the MIMO OTA test system, respectively, and performing beamforming and beamshaping operations in accordance with the received time-varying RF output signals to emit an electromagnetic (EM) beam from the array of probe antenna elements having a predetermined beamform and beamshape that are based on the preselected channel reference model and on the set of fading channel coefficients;

prior to transmitting the plurality of time-varying RF signals from the antenna ports of the transmitter device, configuring the fading emulator, using a test system computer that is in communication with the fading emulator and with the DUT via respective communication links, with the preselected reference channel model and the set of fading channel coefficients to cause the EM beam emitted by the array of probe antenna elements to have the predetermined beamform and beamshape;

detecting the EM beam with a plurality of antenna elements of the DUT, and producing RF output signals; and receiving measurement information at the test system computer from the DUT relating to the RF output signals.

12. The method of claim 11, further comprising:

coupling the EM beam having the predetermined beamform and beamshape onto the antenna elements of the DUT using a lens system disposed in the anechoic chamber between the array of probe antenna elements and the DUT.

13. The method of claim 12, wherein the DUT is located within a radiating near-field zone of the array of probe antenna elements.

14. The method of claim 11, wherein the DUT is located within a radiating far-field zone of the array of probe antenna elements.

15. The method of claim 11, wherein the DUT comprises a base station and the transmitter device comprises a user equipment (UE) device or UE device emulator.

16. The method of claim 11, wherein the transmitter device comprises a base station and the DUT comprises a user equipment (UE) device or UE device emulator.

17. The method of claim 11, wherein the DUT includes no external antenna connectors for electrically interfacing the test system with the antenna elements of the DUT.

18. The method of claim 11, wherein the test system computer obtains the set of fading channel coefficients by executing an algorithm that calculates weighting coefficients for the preselected reference channel model and couples the weighting coefficients with channel coefficients of the preselected reference channel model to obtain the set of fading channel coefficients.

19. The method of claim 11, wherein the test system computer obtains the set of fading channel coefficients by executing an algorithm that determines weighting coefficients for the preselected reference channel model via a calibration process and couples the weighting coefficients with channel coefficients of the preselected reference channel model to obtain the set of fading channel coefficients.

20. The method of claim 11, wherein the test system computer executes an algorithm that obtains weighting coefficients for the preselected reference channel model and causes the weighting coefficients to be uploaded to the fading emulator, and wherein the fading emulator couples the weighting coefficients with channel coefficients of the preselected reference channel model to obtain the set of fading channel coefficients.

21. A computer program comprising computer code for execution by a test system computer of a multiple-input multiple-output (MIMO) over-the-air (OTA) test system for causing a fading emulator of the MIMO OTA test system to operate on time-varying RF signals received at input ports of the fading emulator in accordance with a preselected reference channel model and a set of fading channel coefficients and produce a plurality of time-varying RF output signals, the computer code being stored on a non-transitory computer-readable medium, the computer code comprising:

a first code portion that executes an algorithm that obtains the set of fading channel coefficients; and a second code portion that configures the fading emulator to model the preselected reference channel model with the obtained set of fading channel coefficients, causing the fading emulator to operate on the time-varying RF signals received at the input ports in accordance with the preselected reference channel model to produce time-varying RF output signals output to an array of probe antenna elements of an anechoic chamber including a device under test (DUT), the array of probe antenna elements emitting an electromagnetic (EM) beam, having a predetermined beamform and beamshape based on the preselected reference channel model, received by the DUT.

22. The computer program of claim 21, wherein the first code portion includes computer code that calculates weighting coefficients for the preselected reference channel model and couples the weighting coefficients with channel coefficients of the preselected reference channel model to obtain the set of fading channel coefficients.

23. The computer program of claim 21, wherein the first code portion includes computer code that determines weighting coefficients for the preselected reference channel model via a calibration process and couples the weighting coefficients with channel coefficients of the preselected reference channel model to obtain the set of fading channel coefficients.

24. The computer program of claim 21, wherein the first code portion includes computer code that obtains weighting coefficients for the preselected reference channel model and causes the weighting coefficients to be uploaded to the fading emulator to be coupled by the fading emulator with channel coefficients of the preselected reference channel model to obtain the set of fading channel coefficients.

\* \* \* \* \*